Dec. 14, 1965     S. J. SHEHEEN     3,223,912
PULSE-WIDTH MODULATED D.C. CONTROL SYSTEM
Filed Jan. 20, 1964
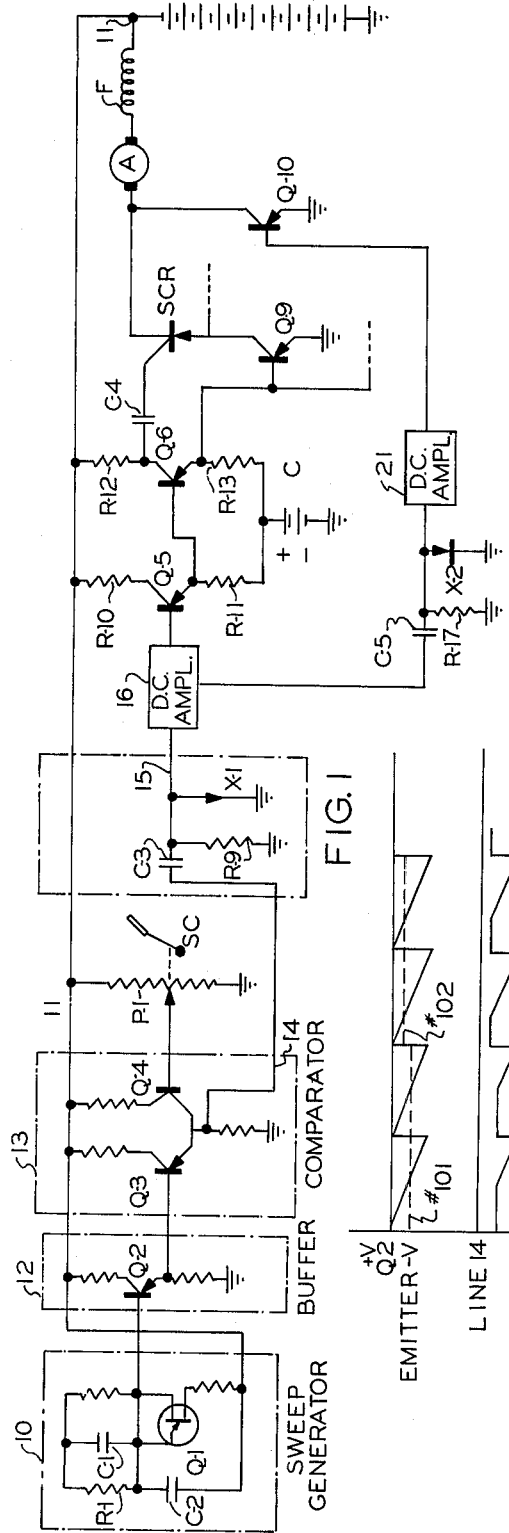
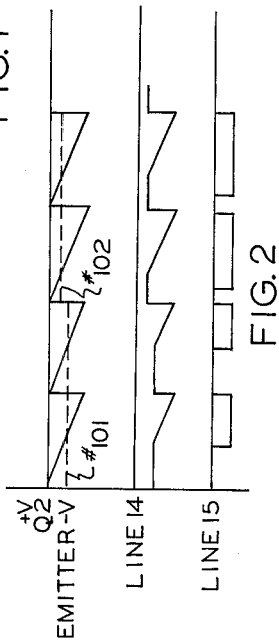
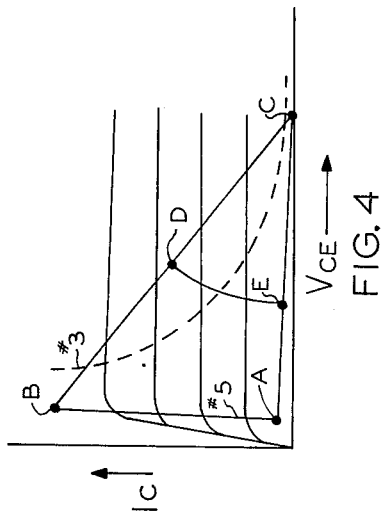
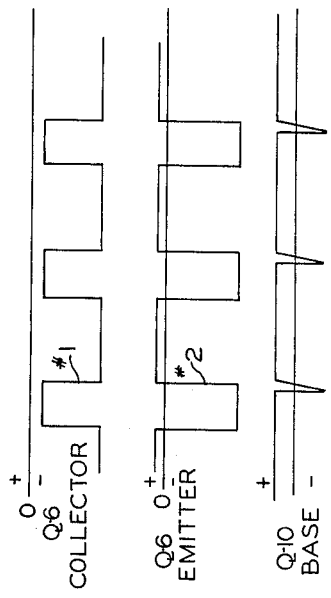
INVENTOR
SHAY J. SHEHEEN
BY *Richard T. Stephens*
ATTORNEY

United States Patent Office 3,223,912
Patented Dec. 14, 1965

3,223,912
PULSE-WIDTH MODULATED D.C. CONTROL SYSTEM
Shay J. Sheheen, Freeville, N.Y., assignor to The Raymond Corporation, Greene, N.Y., a corporation of New York
Filed Jan. 20, 1964, Ser. No. 338,954
4 Claims. (Cl. 318—341)

This invention relates to electrical direct current control systems, and more particularly, to an improved efficient system for substantially stepless current control of an electric motor or like device requiring the supply of a controlled but variable direct current. In the electric arts generally, and especially in the motor control arts, a need exists for efficient and economical, substantially stepless direct current control systems.

In my prior copending application Serial No. 227,270 filed October 1, 1962 I have shown an improved substantially stepless D.C. current control system capable of controlling large currents at relatively high voltages with less power dissipation and requiring fewer components than most semiconductor control systems of the piror art. Generally, the control system of my prior invention includes a controlled rectifier and a power transistor connected in series with a direct current source and a load, with the controlled rectifier and the power transistor connected to be switched by control pulses of variable width or variable repetition rate so as to control the average current supplied to the load from the source. In my prior invention, as well as in many of its predecessors, the semiconductor control elements connected in series between the source and load are driven by essentially rectangular pulses between saturation and cutoff current conditions. The power dissipated in such semiconductor control elements is proportional to the product of the voltage across such elements and the current through such elements, and thus it is necessary or at least desirable in most such circuits that either the voltage across such elements or the current through such elements be small in order to minimize power dissipation in such elements. Most current control systems of this general nature operate by switching rapidly between high voltage-low current conditions (cutoff) and low voltage-high current conditions (saturation). The system disclosed in my above-mentioned copending application offers important advantages over prior art systems, in that the power transistor, which determines the maximum average current which may be applied to the load, is driven through its high power dissipation region only when being turned off and not when being turned on, so that average currents considerably in excess of the series power transistor rating may be controlled, or alternatively, a lesser number of such power transistors need be paralleled in order to control a given load current.

While effective SCR control may be accomplished using series power transistors in the manner shown in my copending application, and while operation of the power transistor on considerably larger average currents may be accomplished readily in accordance with the techniques shown in my prior application, it has become either necessary or desirable to decrease even further the time during which the transistor driven in such an arrangement operates within a high power dissipation region. The present invention, by operating the power transistor in its high energy dissipation region for an even lesser portion of each cycle, enables even higher average currents to be controlled by the same number of high-current transistors or even a lesser number of high-current transistors to be used to control a desired load than my prior invention.

In accordance with the present invention, the power transistor which is connected in series with the SCR is maintained in its high power dissipation region for even a shorter time during "turn off" by use of an auxiliary high-voltage but low-current transistor which is connected across the power transistor-SCR combination and gated on at the same time the power transistor-SCR combination is being shut off, so that the auxiliary transistor shorts across the power transistor-SCR combination during "turn off."

Thus it will be seen that it is a primary object of the present invention to provide an improved direct current control circuit.

FIG. 1 is an electrical schematic diagram illustrating one exemplary embodiment of the invention adapted to control a motor;

FIGS. 2 and 3 are waveform diagrams useful in understanding operation of the invention; and FIG. 4 is a graph useful in understanding voltage-current relationships in the present invention.

In FIG. 1 a very simple sweep generator shown within dashed lines at 10 comprises a unijunction transistor Q–1 which provides a recurrent ramp or sawtooth voltage at a constant frequency determined by the time constant of resistor R–1 and capacitor C–2, a frequency of 1000 c.p.s. being typical. As soon as power is connected to terminal 11 from the power supply, which is shown as comprising battery B, capacitor C–2 begins to charge up at a rate determined by resistor R–1 and capacitor C–2. When the voltage across capacitor C–2 reaches a certain value, unijunction transistor Q–1 conducts, discharging capacitor C–2. A unijunction transistor consists of a bar n type silicon with an ohmic contact at either end, designated as first and second base contacts, and a third connection, designated the emitter, is made near one end through a small amount of $p$ material, providing a rectifying function. The unijunction transistor possesses a highly-stable negative-resistance characteristic which makes it useful in a variety of pulse generator circuits. For a more detailed explanation of the use of the unijunction transistor in such circuits, reference may be had to pp. 58 et seq. of "Electronics," May 1962, McGraw-Hill, New York. Upon conduction of unijunction transistor Q–1 and consequent discharge of capacitor C–2, the sweep generator is at its original condition and another cycle occurs. Four cycles of the sweep generator output voltage at the emitter of transistor Q–1 are shown plotted in FIG. 2.

The constant repetition rate ramp voltage from the emitter of transistor Q–1 of the sweep generator is applied via a conventional emitter follower isolation amplifier 12 including transistor Q–2 to a comparator circuit comprising transistors Q–3 and Q–4. In the absence of any input signal to comparator 13 from buffer amplifier 12, the voltage in the emitters of Q–3 and Q–4 will be seen to be determined by the adjustment of the wiper arm of potentiometer P–1, which is shown by way of example as connected to be positioned manually by actuation of a manual speed control lever SC. The base-emitter junction of Q–4 will be forward biased, and the voltage on line 14 will closely approximate that on the wiper of potentiometer P–1. The base-emitter junction of Q–3 will be seen to be reverse-biased, so that Q–3 will be cut off.

Assume that potentiometer P–1 is adjusted so that the voltage indicated by dashed line 101 in FIG. 2 is present on line 14. As the negative-going sawtooth voltage from Q–2 is applied to the base of Q–3, nothing happens until the base of Q–3 becomes more negative than the Q–4 emitter voltage, at which time the base-emitter junction of Q–3 becomes forward biased, so that Q–3 conducts. Upon conduction the voltage on line 14 follows the Q–2 emitter voltage until it resets, thereby providing ramp pulses on line 14. In FIG. 2 the last two cycles show at #102 a lower value of voltage applied to the base of Q–4, so that line 14 follows the negative-going sawtooth for a larger percentage of each sweep generator cycle, thereby providing wider pulses on line 15.

It will be seen that while the pulse width is shown as being determined by the speed reference voltage applied to the comparator from the wiper of potentiometer P–1, in some forms of the invention the speed reference voltage may be provided by devices other than a manually-adjusted potentiometer. For example, in some motor control systems constructed in accordance with the invention the speed reference voltage may be provided in part or altogether by a conventional techometer generator or by some other voltage signal-producing device responsive to a condition and operative to provide a voltage which varies as a function of desired motor speed.

The ramp voltage pulses of selected width and constant repetition rate on line 14 are applied through a conventional RC differentiating circuit comprising capacitor C–3 and resistor R–9, which converts the ramp pulses to rectangular pulses having a time width corresponding to that of the ramp voltages on line 14, and having very steep, substantially vertical leading and trailing edges. Diode X–1 clips off the positive-going spikes which occur at the end of each pulse and references the negative-going pulses on line 15 to ground, thereby providing a D.C. restoration function. The time-modulated rectangular pulses on line 15 are amplified by means of conventional direct-coupled amplifier stages shown in block form at 16 to provide an input signal to a driver amplifier stage comprising transistor Q–5. The rectangular pulses on line 15 are D.C.-restored, or referenced to ground, in order that the amplitude of the pulses fed to amplifier 16 will be constant rather than varying with pulse width.

In accordance with my prior invention, the series motor field winding F and armature A are connected from the power supply terminal 11 to ground, to which the positive terminal of the power supply is connected, through a series circuit including a silicon controlled rectifier SCR and at least one transistor Q–9. The SCR, Q–9 combination functions as a switch which has either a very high resistance or a very low resistance, depending upon the signals applied to the combination by driver transistor Q–6. When an amplifier negative-going rectangular pulse is applied to the base of transistor Q–5, the negative-going pulse at the emitter of Q–5 drives the base of transistor Q–6, providing a negative-going pulse from the emitter of Q–6 to the base of transistor Q–9, and applying a positive pulse from the collector of Q–6 via coupling capacitor C–4 to the control electrode, or gate lead, of controlled rectifier SCR. The positive-going pulses applied from the Q–6 collector via capacitor C–4 to the SCR control electrode are shown as waveform #1 in FIG. 3, and the negative-going pulses applied from the Q–6 emitter to the Q–9 base are shown as waveform #2. For convenience of explanation, the time at which the voltage on line 15 swings negative to turn on the power switching circuit may be designated $t_1$, and the time at which such voltage swings positive may be designated $t_2$.

The negative-going pulses applied to the base of transistor Q–9 at time $t_1$ saturate transistor Q–9, making its impedance very low, and substantially simultaneously the positive-going pulse applied to the gate lead of SCR turns on controlled rectifier SCR, making its impedance very low. Thus the application of the negative pulse to driver transistor Q–6 turns on or "closes" the switch formed by the SCR, Q–9 series circuit, connecting substantially the full power supply voltage across the motor for the duration of the pulse, i.e., until time $t_2$. When the transistor Q–9 and SCR impedances are high, during the initial portion of a sweep generator cycle, the motor will be seen to be effectively disconnected from the ground return circuit. Since the width of the rectangular pulses on line 15 is determined by the speed reference voltage, the time during each sweep generator cycle that voltage is applied across the motor is determined by the speed reference voltage, thereby determining the time average current through the motor, the average motor torque and the motor speed.

Controlled rectifiers operate in a manner similar to thyratrons in that the control electrode or gate lead essentially loses control once the device begins to conduct, and the voltage must be lowered across the rectifier in order to cut off the device. An SCR operates much like an ordinary rectifier which has been modified to block in the forward direction until a small signal is applied to the gate lead. After the gate signal is applied, the SCR conducts in the forward direction with a forward characteristic much like that of an ordinary rectifier, and it will continue conduction even after the gate signal is removed. An SCR has characteristics very similar to those of a tryratron, except that the forward drop is about one-tenth that of a thyratron, and the deionization time is less by orders of magnitude.

It will be seen that during the "no pulse" interval, when both power transistor Q–9 and rectifier SCR are cut off, that no appreciable current will be flowing through transistor Q–9, and that because the SCR cutoff impedance is substantially greater than that of Q–9, most of the voltage drop across the Q–9, SCR series combination will exist across rectifier SCR. Inasmuch as the SCR is a PNPN device, the back resistance characteristic of the SCR is much like that of two ordinary silicon diodes in series, providing a high back resistance, of the order of megohms. Thus it will be seen that during the "no pulse" interval, with both current through Q–9 small and voltage across Q–9 small, there will be minimum power dissipation in transistor Q–9. During a pulse interval, when both Q–9 and SCR are conducting heavily, transistor Q–9 will be saturated, so that only a low voltage will exist between its collector and emitter, even though a heavy current may be flowing through the transistor. Because the saturation voltage drop is low, the power dissipation in transistor Q–9 will be low. Thus it will be seen that there is low dissipation in transistor Q–9 during both the pulse intervals and the no-pulse intervals.

Considerable power dissipation might conceivably occur in transistor Q–9, however, during the transient conditions which occur at the leading ($t_1$) and trailing ($t_2$) edges of the driving pulses. As explained in detail in my above-mentioned copending application, transistor Q–9, in accordance with my previous invention, passes through the high dissipation region of its operating characteristic only when it is being turned off (i.e., at $t_2$) and not when it is being turned on (at $t_1$), and since transistor Q–9 makes only half as many excursions through its high dissipation region as an ordinary power transistor switch, considerably higher average current may be handled without thermal damage to transistor Q–9, and hence fewer power transistors need be paralleled in order to supply a given average load current.

As indicated in FIG. 1, a fixed positive bias, shown as being derived by battery C and resistor R–13, is applied to the base of transistor Q–9, the value of this bias being determined so as to insure that Q–9 will be driven slightly past cutoff immediately at the end of each negative driving pulse applied from the emitter of driver transistor Q–6. Provision of such a bias to insure that Q–9 will be driven past cutoff insures that there will be minimum dissipation in transistor Q–9 throughout the "no-pulse" intervals between driving pulses. In general such reverse bias operation of transistors has been avoided in the prior art, since obviously, reverse biasing a transistor sometimes gives it a negative-resistance high-dissipation region of operation, so that turning off the transistor with a low value of load resistance sometimes can result in sustained operation in the negative-resistance high-dissipation region and cause thermal runaway and consequent destruction of the transistor. In the present invention, however, as well as in the invention of my above-mentioned copending application, such an arrangement is preferred, so that when the positive-going trailing edge of the driving pulse turns off transistor Q–9, the voltage drop increases across Q–9 and decreases the current through SCR, shutting off SCR so that the load seen by transistor Q–9 drastically decreases. The shutting off of the SCR effectively changes the transistor load line, making it so steep that the negative-resistance high-dissipation region of operation is entirely avoided, and hence reverse bias may be employed to provide minimum "no pulse" or off condition dissipation without encountering the thermal runway which might otherwise result.

In FIG. 4 the characteristics of a typical power transistor are illustrated by a plot of collector current $I_c$ versus voltage drop across the transistor ($V_{ce}$) for several values of base current. Superimposed upon these characteristics are a dashed line #3 indicating a constant (maximum permissible) power dissipation, a first load line #4 indicating the load seen by transistor Q–9 when the controlled rectifier SCR is switched on, and a second load line #5 indicating the load seen by transistor Q–9 when rectifier SCR is turned off, so that it inserts a much higher resistance in series with Q–9. As will be evident, low dissipation operation of transistor Q–9 requires operation to the left of or below line #3, and operation to the right of or above curve #3 for any sustained lengths of time would destroy the transistor.

According to my prior invention, because transistor Q–9 "turn on" at time $t_1$ follows the switching path from point C toward A toward B, rather than from point C directly along line #4 to B, transistor Q–9 passes through its high dissipation region only when being turned off at $t_2$, and not when it is being turned on at $t_1$, so that Q–9 tends to dissipate much less power than it otherwise would. In accordance with the present invention I connect a high-voltage-low current rated transistor Q–10 in parallel with the SCR, Q–9 combination, thereby considerably decreasing even further the power dissipation in transistor Q–9, by decreasing even further the time during each cycle that transistor Q–9 operates in the high dissipation region of its characteristic. The collector of transistor Q–10 is shown connected to the anode of rectifier SCR and the emitter of transistor Q–10 is shown connected to the emitter of transistor Q–9 (both are shown at ground) so that the collector-emitter circuit of transistor Q–10 is connected in parallel with both the SCR and transistor Q–9 series combination and in parallel with a further series circuit comprising the load and the power supply.

The rectangular pulses applied to transistors Q–6 and Q–9 go negative at time $t_1$ to turn on Q–9 and go positive at the end of the pulse (time $t_2$) to turn off Q–9. The base of transistor Q–10, however, is connected to receive a negative pulse, to turn on transistor Q–10 for a brief instant (at time $t_2$) while transistor Q–9 is being turned off. To this end, a square wave is taken from one of the stages represented by D.C. amplifier 16, to provide a negative-going pulse to the base of Q–10 at the same time the Q–9 base is swinging positive, i.e., at time $t_2$. The square wave is differentiated by capacitor C–5 and resistor R–17 to provide a positive-going pulse at the time Q–9 is turned on, i.e., at time $t_1$, and to provide a negative-going pulse at the time Q–9 is being turned off, designated as time $t_2$. These pulses are applied to a conventional noninverting emitter-follower amplifier 21, which may be biased to ignore the positive pulses at time $t_1$, but to apply an amplified negative pulse to the base of transistor Q–10 at time $t_2$. Diode x–2 is shown merely to indicate only negative-going pulses are required at time $t_2$ from amplifier 21. In numerous embodiments of the invention no actual diode need be used, but instead amplifier 21 merely biased to ignore positive pulses. Each time a negative pulse is applied to the base of transistor Q–10, this transistor is immediately turned full on, effectively shorting across the Q–9, SCR series combination. Before the SCR turns off, most of the voltage across the SCR, Q–9 combination is across Q–9, so that shorting across the SCR, Q–9 combination with Q–10 considerably reduces the voltage across Q–9. By gating on transistor Q–10 each time transistor Q–9 is being turned off, transistor Q–9 will follow a different switching path so that it operates for even less time in its high dissipation region, and hence considerably less power is dissipated in transistor Q–9. Without transistor Q–10, transistor Q–9 followed the switching path from point B to point C while being turned off, and as mentioned above, it was the excursion of transistor Q–9 along this path through its high dissipation region which contributed substantially all of the power dissipation in transistor Q–9. Now, with transistor Q–10 simultaneously gated on, transistor Q–9 follows the switching path during turn off from point B down only to point D rather than continuing along toward point C, and upon arriving at point D the characteristic of transistor Q–9 now follows the curved path shown toward point E, so that transistor Q–9 operates in its high dissipation region for an even shorter time, and so that considerably less power is dissipated in transistor Q–9 during a turn-off operation. Because considerably less power is dissipated in transistor Q–9 during a turn-off operation. Because considerably less power is dissipated in transistor Q–9, fewer such transistors needed be paralleled for a given application. As mentioned above, transistor Q–10 may comprise a transistor having a higher voltage rating but a considerably lesser current rating than transistor Q–9. Because transistor Q–10 is turned on only for brief instants while Q–9 is being turned off, Q–10 need be capable of dissipating only a small average current.

While the invention has been illustrated using a pulse width modulator, it will be apparent to those skilled in the art that a constant-width variable frequency pulse generator or a variable-width variable frequency pulse generator may be substituted without departing from the invention. Furthermore, while a specific commercially-available silicon controlled-rectifier has been mentioned in this disclosure, it will be apparent that other controlled rectifiers having similar operating characteristics may be substituted, such as Westinghouse "Trinistors" Types 200A and 200H.

It will be thus seen that the objects set forth above, among those made apparent from the preceding description are efficiently attained, and since certain changes may be made in the above construction without departing from the scope of the invention, it is intended that all matter contained in the above description or shown in the accompanying drawing shall be interpreted as illustrative and not in a limiting sense.

Having described my invention, what I claim as new and desire to secure by Letters Patent is:

1. A direct current control circuit, comprising, in combination: a direct current source; a PNPN semi-conductor controlled rectifier having an anode, a cathode and a control electrode; a first transistor having a base electrode and collector and emitter terminals; a load circuit, said source, said load circuit, the anode-cathode circuit of said controlled rectifier and the collector-emitter circuit of said transistor all being connected in a series circuit; means for providing driving pulses to said control electrode of said controlled rectifier and to said base electrode of said first transistor to switch said controlled rectifier and said first transistor on and off; and a second transistor having a base electrode and a collector-emitter circuit, said collector-emitter circuit of said second transistor being connected in parallel with a series circuit including said anode-cathode circuit of said controllled rectifier and said collector-emitter circuit of said first transistor; and means for applying transient pulses to the base electrode of said second transistor to cause said second transistor to conduct during instants when said controlled-rectifier and said first transistor are being switched off.

2. Apparatus according to claim 1 including means for applying a fixed reverse bias potential to reverse bais said base electrode of said first transistor with respect to said emitter terminal of said first transistor.

3. Apparatus according to claim 1 in which said means for providing driving pulses to said control electrode and said means for applying transient pulses to said base electrode of said second transistor include separate stages of a plural-stage amplifier means, said amplifier means being connected to receive pulse of controlled width to control the average current to said load.

4. A direct current motor control circuit, comprising, in combination: a direct current source; a controlled rectifier having an anode, a cathode and a control electrode; a first transistor having a base electrode and collector and emitter terminals; a direct current motor, said source, said motor, the anode-cathode circuit of said controlled rectifier, and the collector and emitter terminals of said transistor all being connected in a series circuit; a second transistor having a base electrode and a collector-emitter circuit, said collector-emitter circuit being connected in parallel with the series combination of said anode-cathode circuit of said controlled rectifier and said collector-emitter circuit of said first transistor, and means for applying driving pulses to said control electrode of said controlled rectifier and to said base electrodes of said transistors, thereby to vary the average current supplied to said motor.

No references cited.

ORIS L. RADER, *Primary Examiner.*

S. GORDON, *Assistant Examiner.*